Sept. 10, 1968     R. W. WOODRING     3,400,527
FLAIL KNIFE MOUNTING
Filed Dec. 13, 1965
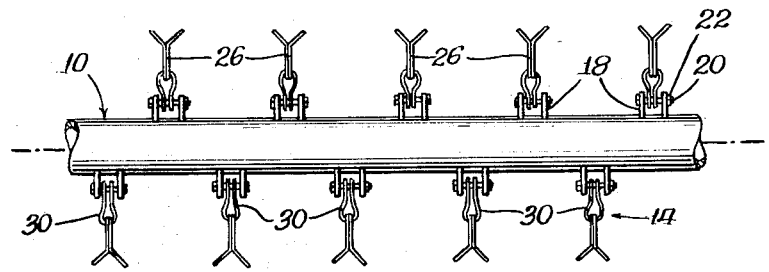
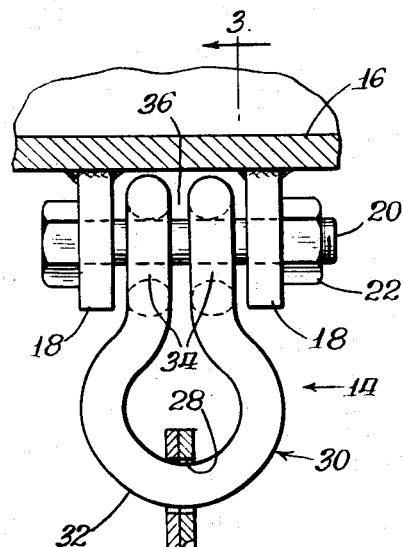
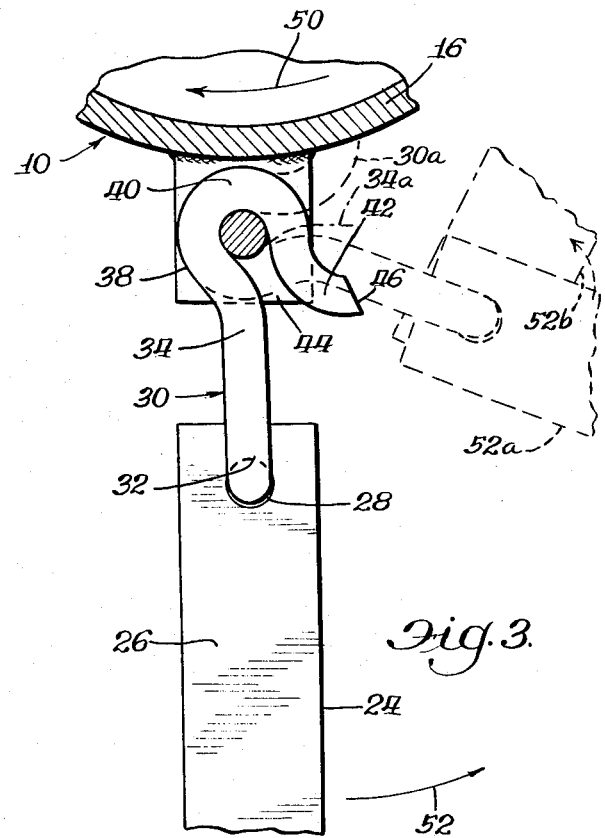
Inventor:
Robert W. Woodring
By: John J. Kurrich Atty.

United States Patent Office 3,400,527
Patented Sept. 10, 1968

3,400,527
FLAIL KNIFE MOUNTING
Robert W. Woodring, La Grange, Ill., assignor to International Harvester Company, a corporation of Delaware
Filed Dec. 13, 1965, Ser. No. 513,257
7 Claims. (Cl. 56—294)

The present invention relates to a flail knife mounting.

The invention is applicable particularly to mowers of the type having a transverse, horizontal rotatable shaft on which are mounted a plurality of knives which fly out toward radial position upon rotation of the shaft.

A principal object of the present invention is to provide a novel flail knife mounting for use in a mower of the character referred to, which can be mounted on the shaft and removed therefrom in an extremely quick and easy manner.

Another object is to provide such a flail knife and mounting which utilizes lugs on the shaft and a mounting element therein, and in which the knives can be mounted and removed simply by a hooking and unhooking step, without the necessity for removing the mounting element referred to.

A further object is to provide a flail knife and mounting of the charatcer referred to, which cannot be accidentally dislodged from its mounting notwithstanding the fact that it is mounted by a hook.

Still another object is to provide a flail knife and mounting of the foregoing general character which includes means for absorbing shock which might otherwise occur when the knife flies out of its normal cutting position upon striking a solid object on the ground.

Other objects and advantages of the invention will appear from the following detail description taken in conjunction with the accompanying drawings in which:

FIGURE 1 is a fragmentary view of a portion of a mower embodying the knives of the present invention;

FIGURE 2 is a detail view of a knife and mounting, and a portion of the shaft on which it is mounted; and FIGURE 3 is a view taken at line 3—3 of FIGURE 2.

Referring now in detail to the drawings, FIGURE 1 shows a portion of a shaft 10 of a mower of the general character referred to above, which is mounted horizontally in the mower and rotatable about its central longitudinal axis 12, transverse to the direction of movement of the mower. A plurality of flail knife assemblies 14 are mounted on the shaft, the details of which are described below and shown in FIGURES 2 and 3.

The shaft 10 is preferably tubular, having a wall element 16 and may be circular in cross section as here shown. Secured to the shaft as by welding, for each knife assembly, is a pair of axially spaced lugs 18. A mounting element 20 preferably in the form of a bolt is mounted in the lugs, extending through aligned apertures therein and secured in place by a nut 22.

Flail knives 24, usually two in number, are utilized, these knives being of any desired form. As here shown they have body portions 26 of plate-like form having apertures 28 for receiving a mounting ring or link 30. The ring 30 includes a central loop or bight 32 which merges into a pair of legs 34 spaced apart a short distance and defining a gap 36 therebetween. The legs 34 themselves merge into hooks 38 lying in parallel planes perpendicular to the plane of the loop 32. The hooks include loops or bights 40 which terminate in terminal extensions 42 forming return bends relative to the legs 34 and define a gap 44 therebetween, and bend in the opposite direction and define terminal end surfaces 46.

To assemble the elements, the two knives 24 together are threaded over one of the hooks 38, i.e., the hook is inserted through the apertures 28 of the knives and then the knives are worked along the terminal extension or end portion 42, around the loop 40, and then moved down along the corresponding leg 34 onto the central loop or bight 32. The gaps 36 and 44 are each preferably only sufficient to receive the knives, and it is within the scope of the invention to have such space less than the thickness of the two knives together, since the knives can be put onto the ring individually. The gap 44 particularly is narrower than the diameter of the bolt 20. After the knives are put onto the ring, the ring is put in place by hooking the hooks 38 over the bolt which may be done by fitting the end portions 42 to the space between the bolt and the shaft and then forcing the link into place by working, plying, spreading or prying it, etc., and if necessary it can be given a blow with a hammer to force it into place. In this operation the hook expands sufficiently to receive the bolt through the gap 44 and then after the ring is in place the hook again closes to its normal position closing the gap to its normal dimension less than the diameter of the bolt. In the normal operation of the mower the ring will remain in place and will not be dislodged notwithstanding the fact that it is merely hooked in place by an open hook. The ring is removed for replacement of the knives, by reverse movements.

In the normal operation of the mower, the shaft 10 is rotated in the direction indicated by the arrow 50, or in clockwise direction as viewed in FIGURE 3. If the knives should strike a solid object on the ground, they would be deflected in the opposite direction, or in counterclockwise direction as indicated by the arrow 52, and move up to or toward the dotted line positions 52a and 52b. The link 30 is of course thrown in the same direction to its dot-dash line position 30a where the end surface 46 engages the shaft. In this action the legs 34 spring toward the end portion 42 in view of the positive limiting action on the latter, to the position indicated at 34a, partially closing the gap 44, as shown, to a distance substantially less than before and much less than the diameter of the bolt. Consequently, any tendency of the ring to unhook from the bolt is thereby obviated.

Additionally this action of the end portions 42 engaging the shaft produces a shock absorbing action. The ring 30 is preferably made of spring steel, possessing a substantial degree of resilience and it yields under the impact force of engaging the shaft, with consequent minimizing of any damage that might otherwise occur.

The hooks 38 are preferably relatively closely spaced, as represented in FIGURE 2, thereby enabling correspondingly close positioning of the lugs 18, resulting in a compact arrangement. The loop 32 can of course be relatively large, as here represented, if desired. The practical limitation in closely spacing the hooks 38 is to provide the gap 36 of sufficient width to enable putting the knives in place on the ring. The gap 44 should be only sufficiently large to enable placing the knives in place on the ring and less than the diameter of the bolt. A great advantage resides in the fact that knives can be put in place and removed therefrom without removing the bolt 20.

While I have herein disclosed a preferred form of the invention, it will be understood that changes may be made therein within the spirit and scope of the appended claims.

I claim:

1. A flail knife and mounting for use with a rotary shaft, comprising, lugs secured to the shaft, an axially positioned mounting element supported by the lugs, a knife, and a ring swingably supporting the knife on the mounting element, the ring having a hook and being mountable on the mounting element by hooking the hook substantially normal to said ring transversely thereover.

2. The invention set out in claim 1 wherein the hook has a leg and a return portion spaced therefrom defining a gap therebetween, the gap receiving the mounting element pursuant to the hook being hooked over the mounting element, the gap being normally of less spacing than the transverse dimension of the mounting element.

3. The invention set out in claim 2 wherein the ring is made of spring steel and thereby enables the return portion to flex away from the leg to enlarge said gap to enable the hook to be hooked over the mounting element, and to flex toward it to reduce the gap to its normal dimension less than the transverse dimension of the mounting element.

4. The invention set out in claim 1 wherein the shaft is arranged for rotation in a predetermined direction, the hook of the ring has a gap receiving the mounting element in the operation of hooking the hook over the mounting element, said gap being disposed on the trailing side of the mounting element relative to said direction of rotation of the shaft.

5. The invention set out in claim 1 wherein said hook includes a leg and a return portion spaced therefrom defining a gap therebetween and the return portion has a terminal element positioned for engagement with the shaft upon relative swinging movement of the knife and ring about the axis of the mounting element, said terminal element of the hook being bent outwardly from said leg progressively toward its end surface, and the end surface being arranged for engaging the shaft substantially throughout its own area.

6. The invention set out in claim 1 wherein the ring is made of spring steel, and the hook has a yieldable portion engageable with the shaft upon swinging motion of the knife and ring pursuant to engagement by the knife with an obstacle on the ground, whereby to provide shock absorbing action on the ring and knife.

7. The invention set out in claim 1 wherein said lugs have aligned apertures therein, said mounting element consists of a bolt mounted in said apertures said ring is made of spring steel and has a central loop directly supporting the knife, the loop merges into a pair of legs defining a relatively narrow first gap therebetween, said legs being bent into hooks disposed in parallel planes transverse to the plane of the central loop, the hooks have return-bend terminal portions spaced apart from and defining a gap with the legs which is substantially less than the diameter of the bolt and similar in dimension to the first gap, the ring being mounted on the bolt in such position that the second mentioned gap is in trailing direction relative to the direction of rotation of the shaft, and the return-bend portions of the hooks themselves are reverse-bent away from leg portions progressively toward their extreme terminal ends, and the extreme terminal ends are positioned for full-area engagement with the shaft upon swinging movement of the knife and link about the axis of the bolt pursuant to the knife engaging an obstacle on the ground.

References Cited

UNITED STATES PATENTS

| | | | |
|---|---|---|---|
| 2,711,067 | 6/1955 | Mott | 56—289 |
| 3,043,080 | 7/1962 | Mott | 56—294 |
| 3,122,871 | 3/1964 | Frevik | 56—26 X |
| 3,177,640 | 4/1965 | Mott | 56—504 X |

ALDRICH F. MEDBERY, *Primary Examiner.*